United States Patent [19]
Bronca et al.

[11] 3,767,842
[45] Oct. 23, 1973

[54] SUPER CONDUCTING CABLE OF ELEMENTAL CONDUCTORS IN A METAL MATRIX WITHIN A METALLIC JACKET

[75] Inventors: Gaston Bronca, Fontenay-aux-Roses; Jean-Paul Pouillange, Bagneux, both of France; Ivan Hlasnik, Bratislava, Czechoslovakia

[73] Assignee: Commissariat A L'Energie Atomique, Paris, France

[22] Filed: Feb. 25, 1972

[21] Appl. No.: 229,439

[52] U.S. Cl.......... 174/128, 174/15 C, 174/DIG. 6, 335/216
[51] Int. Cl............................................. H01v 11/00
[58] Field of Search................ 174/126 R, 126 CP, 174/128, 15 C, DIG. 6; 335/216; 29/599

[56] References Cited
UNITED STATES PATENTS

| | | | |
|---|---|---|---|
| 3,616,530 | 11/1971 | Chester | 174/DIG. 6 |
| 3,614,301 | 10/1971 | Royet | 174/DIG. 6 |
| 3,527,873 | 9/1970 | Brechna et al. | 174/DIG. 6 |
| 3,596,349 | 8/1971 | Boom | 174/DIG. 6 |
| 3,625,662 | 12/1971 | Roberts et al. | 174/DIG. 6 |
| 3,366,728 | 1/1968 | Garwin et al. | 174/DIG. 6 |
| 3,277,564 | 10/1966 | Webber et al. | 174/DIG. 6 |
| 3,548,078 | 12/1970 | Albrecht | 174/128 |

Primary Examiner—Bernard A. Gilheany
Assistant Examiner—A. T. Grimley
Attorney—William B. Kerkam, Jr.

[57] ABSTRACT

A superconducting cable fabricated in accordance with the method claimed comprises an assembly of elemental conductors formed of unitary segments embedded in a conductive metallic matrix. The assembly is encased in a jacket of metal or metal alloy having high electrical resistivity, then impregnated with a metal alloy having a low melting point which adheres to the jacket.

By means of the method, losses of electric energy are considerably reduced and the cable is provided with higher tensile strength and improved mechanical characteristics.

4 Claims, 3 Drawing Figures

3,767,842

SUPER CONDUCTING CABLE OF ELEMENTAL CONDUCTORS IN A METAL MATRIX WITHIN A METALLIC JACKET

This invention relates to a method which makes it possible to reduce the electric energy losses of certain superconducting cables of the high current-intensity type which are intended to operate in the presence of constant or variable magnetic fields and also to increase the mechanical strength of these cables.

It is known that the superconducting magnets of synchrotrons supplied with pulsed current must be constructed in particular by means of superconducting cables which are capable of transporting a current of several thousand amps, high intensities of this order being adopted with a view to setting a reasonable limit on the terminal voltage of these magnets. Energy losses then develop in the superconducting windings, these losses being of electromagnetic origin resulting from a variation of the magnetic flux within the superconductor.

It is also known that, in order to reduce the level of these losses, it is an advantage to employ very fine segments of superconducting wire of the order of a few microns in diameter. Moreover, these superconducting segments are not developed individually but a number of these latter, namely of the order of a few hundred, are co-drawn within a metallic matrix which is usually of copper, or of copper and cupronickel. The mean longitudinal resistivity of the material of said matrix is usually chosen so as to have a low value, this matrix being intended to shunt the superconductor for transporting the current at the time of occurrence of a transition, either local or otherwise, to the normal state. The superconducting segments which are initially parallel to the axis of the matrix are also twisted within this latter, the effect of twisting being to transpose the superconducting segments with respect to the external magnetic field or, in other words, to cause each of said segments to take up successively the positions of the other segments within the cable. However, this transposition is not effective with respect to the magnetic field produced by the currents transported by the superconducting segments themselves, this magnetic field being referred-to as the natural field of the elemental conductor as constituted by the complete assembly of superconducting segments which are co-drawn within the metallic matrix. As the superconducting segments of an elemental conductor are not insulated with respect to each other, the circulating currents which are induced in a variable magnetic regime accordingly follow a closed path between said segments, across the metallic matrix and within one twist pitch. These circulating currents result in losses which can be reduced, but not eliminated, by reducing the length of the twist pitch of the superconducting segments within their matrix.

In order to limit the dangers of instability of the elemental conductor as well as the additional losses related to the non-transposition of the superconducting segments with respect to the natural field of the elemental conductor, and in order to permit the possibility of forming a sufficiently short twist pitch, it has been found necessary to set an upper limit of a few tenths of a millimeter on the diameter of the elemental conductor. An elemental conductor of this type is capable of transporting a current of only a few tens of amps.

Consequently, in order to form a cable which is capable of transporting a few thousand amps, it is necessary to assemble a certain number of elemental conductors, this assembly being intended to achieve perfect transposition of said conductors. To this end, the assembly operation can consist in braiding or in stranding of the elemental conductors to a certain extent, said conductors being joined together in such manner as to prevent the appearance of losses of mechanical origin arising from the friction between conductors under the action of pulsed magnetic forces and in order to produce a complete conductor which exhibits fairly low deformability.

This cohesion can be obtained by impregnating with insulating material the complete assembly of elemental conductors which have previously been electrically insulated with respect to each other. However, considerations of a mechanical order, for example, may make it necessary to give preference to the use of a binder instead of an insulating impregnating material. This binder could consist of a metal alloy having a sufficiently low melting point (400° C at a maximum), namely an alloy such as indium-tin, silver-tin, lead-tin, in order to avoid any risk of damage to the superconductor at the time of addition of this material in the state of either a liquid or a paste. Unfortunately, in the case just mentioned, it is not possible to ensure preliminary electric insulation of the assembled elemental conductors since these metal alloys do not wet the insulating covering of the elemental conductors and consequently do not adhere to this latter. On the other hand, if the elemental conductors are not insulated, it is possible to bond them together by means of a metal alloy but, in this case, circulating currents follow a closed path between elemental conductors across the bonding alloy. However, it should be noted that these currents and the losses of electric energy which they create are of smaller value as the pitch of transposition of the cable is smaller and that the resistivity of the bonding alloy is higher. However, the lower limit of the pitch of transposition of the elemental conductors which constitute the final conductor is in practice of the order of a few centimeters and the resistivity of low melting-point alloys such as lead-tin or indium-tin alloy does not exceed $10^{-8}$ ohm-meter at the temperature of liquid helium. Under these conditions, a calculation shows that these additional losses are considerable, as compared with the total losses developped within the superconductor.

This invention relates to a method of manufacture of a superconducting cable subjected to a magnetic field, said cable being constituted by an assembly of elemental conductors formed by a plurality of segments, in which the losses arising from circulating currents are reduced to a considerable extent and the mechanical properties of the cable are enhanced.

To this end, the method essentially consists in cladding the elemental conductor surrounded by its copper matrix with a layer of metal or metal alloy having high resistivity.

This cladding or jacket can consist of a metal or metal alloy which, by reason of its high electrical resistivity, increases the resistance of the circuit through which circulating currents flow in closed paths between elemental conductors. In fact, at the time of drawing of the elemental conductor, said conductor is clad with an alloy such as cupronickel or stainless steel, the melting point and hardness of which are sufficiently high to ensure that these materials lend themselves to the drawing operation and the resistivity of which is higher than $10^{-7}$ ohm-meter at low temperature, especially the temperature of liquid helium. This operation is followed by consolidation of the final conductor which is carried out by means of a bonding alloy having a low melting point and adhering to the hard alloy which serves as cladding material for the elemental conductor. When the fabrication of the elemental conductor is completed, the hard alloy jacket of high electrical resistivity has a thickness of a few tens of microns; under these conditions, additional losses are reduced by a factor of 10 or even of 100, depending on the value of resistivity of the alloy to the metal chosen.

Moreover, independently of its effect on the additional losses mentioned above, the jacket of hard alloy or metal makes it possible to increase the tensile strength of the elemental conductor and more generally to improve its mechanical characteristics. For the purpose just mentioned, the jacket can be applied to superconducting cables in which the elemental conductors are covered with insulating material and are therefore not subject to the additional losses referred-to above, or alternatively to superconducting cables which are subjected to a constant magnetic field.

A better understanding of the invention will be obtained from the following description in connection with one example of construction which is given by way of indication but in which no limitation is intended, reference being made to the accompanying drawing in which an elemental conductor is shown in cross-section in FIG. 1 with a hard alloy jacket having high electrical resistivity;

Figure 1:
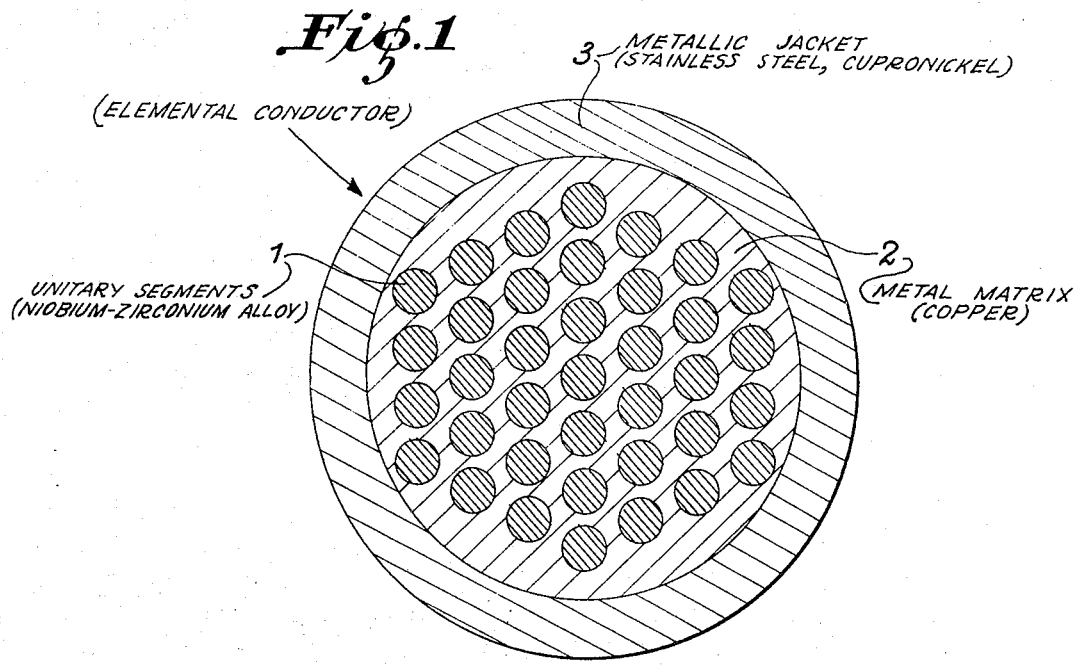
Figure 2:
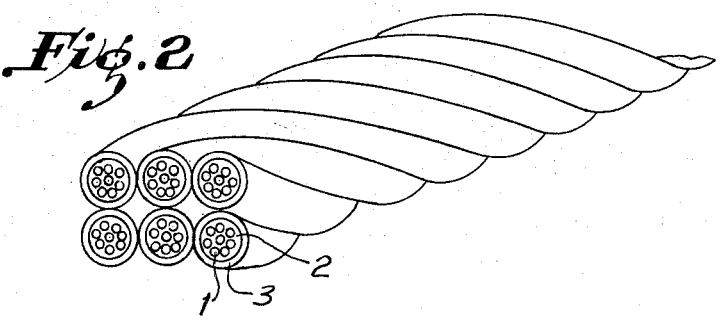
FIG. 2 shows a plurality of elemental conductors formed as a cable.
Figure 3:
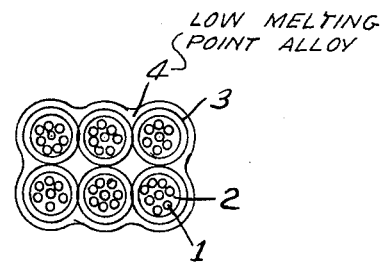
FIG. 3 is and end view of the cable of FIG. 2 covered with a low melting point alloy.

As illustrated in FIG. 1, the elemental conductor comprises a plurality of superconducting unitary segments embedded in a metallic matrix 2, the number of said segments being, for example, seven, 19, 37, 61, and so forth. By way of example, the superconducting segments can be formed of superconducting material such as a niobium-zirconium alloy, a niobium-titanium alloy or a superconducting intermetallic compound such as niobium-tin ($Nb_3$-Sn). The assembly consisting of the matrix 2 and unitary segments is covered with a metallic jacket 3 having high electrical resistivity and good mechanical strength, the assembly being then co-drawn within said metallic jacket 3. The matrix 2 is formed of a metal having good conductivity in the normal state and permits current transport at the time of local transition of the superconductor; the matrix can be of pure copper, for example, while the metallic jacket 3 is made of stainless steel or of cupronickel, for example. The elemental conductors thus formed are then assembled by stranding as in FIG. 2 or by braiding; in the case last mentioned, this assembly can be pressed so as to form a flat cable. The superconducting cable thus formed is finally impregnated with a metal alloy 4 (FIG. 3) having a low melting point which adheres to the metallic jacket 3 and thus ensures consolidation of the coil.

What we claim is:

1. A superconducting cable comprising an assembly of elemental conductors which are formed of a plurality of unitary segments embedded in a matrix of a metal having good conductivity and are covered with a jacket of a metal or metal alloy having high electrical resistivity, the assembly consisting of elemental conductors being impregnated without interposition of insulating material with a metal alloy having a low melting point.

2. A superconducting cable in accordance with claim 1, wherein the jacket has high mechanical strength.

3. A superconducting cable in accordance with claim 1, wherein the jacket is of stainless steel or of cupronickel.

4. A superconducting cable in accordance with claim 1, wherein the assembly consisting of elemental conductors is obtained by braiding or stranding.

* * * * *

UNITED STATES PATENT OFFICE
CERTIFICATE OF CORRECTION

Patent No. 3,767,842         Dated October 23, 1973

Inventor(s)  Bronca et al.

It is certified that error appears in the above-identified patent and that said Letters Patent are hereby corrected as shown below:

-- Foreign Application Priority Data

France - EN 71,06641 filed February 26, 1971 --.

Signed and sealed this 16th day of July 1974.

(SEAL)
Attest:

McCOY M. GIBSON, JR.
Attesting Officer

C. MARSHALL DANN
Commissioner of Patents